United States Patent
Ishii et al.

(10) Patent No.: US 11,939,745 B2
(45) Date of Patent: Mar. 26, 2024

(54) ELECTRICALLY DRIVEN CONSTRUCTION MACHINE

(71) Applicant: Hitachi Construction Machinery Tierra Co., Ltd., Koka (JP)

(72) Inventors: Takeshi Ishii, Hino-Cho (JP); Kiwamu Takahashi, Moriyama (JP); Taihei Maehara, Koka (JP); Tatsuo Takishita, Koka (JP)

(73) Assignee: Hitachi Construction Machinery Tierra Co., Ltd., Koka (JP)

( * ) Notice: Subject to any disclaimer, the term of this patent is extended or adjusted under 35 U.S.C. 154(b) by 811 days.

(21) Appl. No.: 16/980,669

(22) PCT Filed: May 23, 2019

(86) PCT No.: PCT/JP2019/020455
§ 371 (c)(1),
(2) Date: Sep. 14, 2020

(87) PCT Pub. No.: WO2020/049805
PCT Pub. Date: Mar. 12, 2020

(65) Prior Publication Data
US 2021/0025132 A1    Jan. 28, 2021

(30) Foreign Application Priority Data
Sep. 5, 2018    (JP) .................................. 2018-166403

(51) Int. Cl.
*G05B 99/00* (2006.01)
*B60L 9/00* (2019.01)
(Continued)

(52) U.S. Cl.
CPC ................ *E02F 9/207* (2013.01); *B60L 9/00* (2013.01); *B60L 15/38* (2013.01); *E02F 9/2004* (2013.01);
(Continued)

(58) Field of Classification Search
CPC ............................................ G05B 2219/2639
See application file for complete search history.

(56) References Cited

U.S. PATENT DOCUMENTS

| | | | | |
|---|---|---|---|---|
| 2003/0147727 A1* | 8/2003 | Fujishima | ................ | H04Q 9/10 |
| | | | | 414/200 |
| 2013/0006457 A1* | 1/2013 | Anders | ................ | B60W 20/10 |
| | | | | 180/65.265 |

(Continued)

FOREIGN PATENT DOCUMENTS

| | | | | |
|---|---|---|---|---|
| EP | 2 889 432 A1 | 7/2015 | | |
| EP | 2746124 B1 * | 8/2018 | ............... | B60K 6/46 |

(Continued)

OTHER PUBLICATIONS

International Search Report (PCT/ISA/210) issued in PCT Application No. PCT/JP2019/020455 dated Aug. 13, 2019 with English translation (three pages).

(Continued)

*Primary Examiner* — Suresh Suryawanshi
(74) *Attorney, Agent, or Firm* — Crowell & Moring LLP

(57) ABSTRACT

An electrically driven construction machine is provided in which, in a case where a plurality of electrically driven construction machines operate simultaneously, it is possible to avoid exceeding the allowable electric power that can be output by the electric power receiving facility of a commercial electric power supply. A controller computes an own demanded power Pd1 for driving the plurality of hydraulic actuators, on the basis of operation signals of the operation devices, computes an allowable power as a power limit value usable by the electric motor on the basis of the own demanded power, the demanded powers of the other electrically driven construction machines received through the communication device, and an allowable electric power of the electric power receiving facility of the commercial (Continued)

electric power supply, and controls the electric motor such that a power consumption of the electric motor does not exceed the allowable power.

5 Claims, 10 Drawing Sheets

(51) Int. Cl.
*B60L 15/38* (2006.01)
*E02F 9/20* (2006.01)
*E02F 9/22* (2006.01)
*H02J 3/14* (2006.01)
*H02J 7/02* (2016.01)
*E02F 3/32* (2006.01)
*E02F 3/42* (2006.01)
*G05B 15/02* (2006.01)
*G05B 19/02* (2006.01)
*H02P 27/06* (2006.01)

(52) U.S. Cl.
CPC .......... *E02F 9/2228* (2013.01); *E02F 9/2267* (2013.01); *E02F 9/2271* (2013.01); *E02F 9/2285* (2013.01); *H02J 3/14* (2013.01); *H02J 7/02* (2013.01); *B60L 2200/40* (2013.01); *B60L 2240/421* (2013.01); *E02F 3/32* (2013.01); *E02F 3/425* (2013.01); *E02F 9/2292* (2013.01); *G05B 15/02* (2013.01); *G05B 19/02* (2013.01); *G05B 2219/2639* (2013.01); *H02P 27/06* (2013.01)

(56) References Cited

U.S. PATENT DOCUMENTS

| | | | | |
|---|---|---|---|---|
| 2013/0318956 | A1* | 12/2013 | Yunoue | E02F 9/2285 60/431 |
| 2014/0032006 | A1 | 1/2014 | Tojima et al. | |
| 2015/0231974 | A1* | 8/2015 | Yunoue | E02F 9/2296 307/10.1 |
| 2016/0076227 | A1* | 3/2016 | Hoshino | B60W 10/08 180/65.265 |
| 2017/0129473 | A1* | 5/2017 | Zhang | B60W 20/11 |

FOREIGN PATENT DOCUMENTS

| | | |
|---|---|---|
| JP | 2010-206978 A | 9/2010 |
| JP | 2013-236529 A | 11/2013 |
| JP | 2014-155248 A | 8/2014 |

OTHER PUBLICATIONS

Japanese-language Written Opinion (PCT/ISA/237) issued in PCT Application No. PCT/JP2019/020455 dated Aug. 13, 2019 (three pages).

International Preliminary Report on Patentability (PCT/IB/338 & PCT/IB/373) issued in PCT Application No. PCT/JP2019/020455 dated Mar. 18, 2021, including English translation of document C2 (Japanese-language Written Opinion (PCT/ISA/237) filed on Sep. 14, 2020) (seven (7) pages).

Extended European Search Report issued in European Application No. 19858614.1 dated May 3, 2022 (eight (8) pages).

* cited by examiner

FIG. 7

| ACTION STATE | | POWER SUPPLY SOURCE | ACTION CONDITIONS | |
|---|---|---|---|---|
| | | | START CONDITION | STOP CONDITION |
| OPERATION MODE | | COMMERCIAL ELECTRIC POWER SUPPLY | CHARGE SWITCH OFF AND KEY SWITCH START AND COMMERCIAL ELECTRIC POWER SUPPLY CONNECTED AND RAPID CHARGER DISCONNECTED | KEY SWITCH OFF |
| | | BATTERY DEVICE | CHARGE SWITCH OFF AND KEY SWITCH START AND COMMERCIAL ELECTRIC POWER SUPPLY DISCONNECTED AND RAPID CHARGER DISCONNECTED | KEY SWITCH OFF OR DECREASE IN REMAINING BATTERY CAPACITY |
| CHARGE MODE | | COMMERCIAL ELECTRIC POWER SUPPLY | CHARGE SWITCH ON AND KEY SWITCH OFF AND COMMERCIAL ELECTRIC POWER SUPPLY CONNECTED | CHARGE SWITCH OFF OR BATTERY FULLY CHARGED |
| | | DIRECT-CURRENT POWER RAPID CHARGER | CHARGE SWITCH ON AND KEY SWITCH OFF AND RAPID CHARGER CONNECTED | CHARGE SWITCH OFF OR BATTERY FULLY CHARGED |

ELECTRICALLY DRIVEN CONSTRUCTION MACHINE

TECHNICAL FIELD

The present invention relates to an electrically driven construction machine such as a hydraulic excavator, for example, and particularly to an electrically driven construction machine that drives a hydraulic pump by using, as a power source, an electric motor driven by electric power supplied from an external electric power supply device.

BACKGROUND ART

Many of construction machines typified by hydraulic excavators perform work by using a diesel engine as a power source, and operating hydraulic actuators by a pressurized fluid fed from a hydraulic pump coupled to the diesel engine.

There is a problem in that the exhaust gas of the diesel engine generally includes particulate matter (PM) and nitrogen oxide (NOx) in large quantities as compared with an engine using another fuel such as gasoline as a power source.

Accordingly, rapid progress in setting statutory regulations is being made worldwide to reduce the above-described substances included in the exhaust gas of the diesel engine stepwise.

From such a background, there is a possibility that many construction machines operating on work sites may henceforth make a transition to electrically driven construction machines that use electricity as a power source, and do not generate the exhaust gas.

Under such a background, Patent Document 1 describes a technology related to a charging device that calculates and controls a threshold value of an output current such that electric power at a time of charging supplied to an electrically driven construction machine mounting a battery does not exceed an allowable electric power based on an electric power contracted with an electric power supplier. This charging device is provided with means for inputting electric power specifications (corresponding to contracted electric power in the present specification) set in an electric power receiving apparatus (corresponding to an electric power receiving facility of a commercial electric power supply in the present specification).

PRIOR ART DOCUMENT

Patent Document

Patent Document 1: JP-2010-206978-A

SUMMARY OF THE INVENTION

Problem to be Solved by the Invention

Some electrically driven construction machines such as hydraulic excavators operate by driving an electric motor by electric power supplied to a machine body from an electric power distribution board provided on a work site through a feed cable, and actuating a hydraulic pump.

In a case where a plurality of such electrically driven construction machines are operated on one work site, the electric power distribution boards are provided in operation ranges of the respective electrically driven construction machines, and each distribution board is supplied with electric power from an electric power receiving facility (external electric power supply) of a commercial electric power supply, the electric power receiving facility being installed in the vicinity of the work site (within the premises of a factory or the like).

In general, the electric power receiving facility of the commercial electric power supply is installed within the premises of a factory or the like, and transforms the electric power of the commercial electric power supply in the electric utility side and supplies the transformed power to the distribution boards at respective places within the work site. When power consumption within the work site increases, and the electric power supplied from the electric power receiving facility exceeds the electric power contracted with the electric power supplier, an excess charge, interruption of a load, or the like may occur.

Therefore, in a case where the plurality of electrically driven construction machines are operated within the work site using the same electric power receiving facility, it is necessary to provide means for limiting a total value of electric powers supplied to the respective electrically driven construction machines through the distribution boards to an allowable electric power value or lower so as not to exceed the contracted electric power, and efficiently distributing and supplying the electric power to the plurality of electrically driven construction machines.

The above-described Patent Document 1 is a technology related to the charging of an electrically driven construction machine mounted with a battery. However, the technology can operate a plurality of electrically driven construction machines by a configuration in which the charging device is replaced with the electric power distribution board. When such a configuration is considered, Patent Document 1 has the following problems.

The threshold value of an output current in Patent Document 1 is only set so that electric power supplied to one electrically driven construction machine does not exceed the allowable electric power of the electric power receiving facility (electric power receiving apparatus), and a limitation value corresponding to the demanded power of each electrically driven construction machine in the case where the plurality of electrically driven construction machines operate is not considered. The electrically driven construction machines differ in terms of machine body specifications, work contents, the state of the work site, a load state such as an operation rate per work time. Thus, the power demanded by each machine body differs.

Therefore, when appropriate electric power supply limitation according to the powers demanded by the machine bodies is not performed, a problem, for example, an imbalance in work speed between different machine bodies, a stop of a high-load machine body, or the like occurs.

The present invention has been made in view of the problems of the above-described conventional technology. It is an object of the present invention to provide an electrically driven construction machine in which, in a case where a plurality of electrically driven construction machines operate simultaneously, it is possible to avoid exceeding the allowable electric power that can be output by the electric power receiving facility of a commercial electric power supply as an external electric power supply while distributing supplied electric power without a work imbalance between different machine bodies according to the respective demanded powers of the plurality of electrically driven construction machines thereby make it possible to perform work efficiently within an allowable electric power of the electric power receiving facility.

Means for Solving the Problem

In order to achieve the above-described object, according to the present invention, there is provided an electrically driven construction machine comprising: an electric motor; a hydraulic pump driven by the electric motor; a plurality of hydraulic actuators driven by a pressurized fluid delivered from the hydraulic pump; a plurality of directional control valves that control flows of the pressurized fluid supplied from the hydraulic pump to the plurality of hydraulic actuators; and a plurality of operation devices that generate operation signals for instructing operation of the plurality of hydraulic actuators and switching the plurality of directional control valves, the electric motor being driven by an electric power from an electric power receiving facility; wherein the electrically driven construction machine further comprises: a communication device that transmits and receives data to and from other electrically driven construction machines sharing the electric power receiving facility; and a controller configured to compute an own demanded power for driving the plurality of hydraulic actuators on a basis of the operation signals of the plurality of operation devices, transmit the own demanded power to the other electrically driven construction machines through the communication device, and receive demanded powers computed in the other electrically driven construction machines through the communication device, and wherein the controller is further configured to compute an allowable power usable by the electric motor on a basis of the own demanded power, demanded powers of the other electrically driven construction machines received through the communication device, and an allowable electric power of the electric power receiving facility, and control the electric motor such that a power consumption of the electric motor does not exceed the allowable power usable by the electric motor.

In this way, by computing the own demanded power, transmitting the own demanded power to the other electrically driven construction machines through the communication device, receiving the demanded power computed in the other electrically driven construction machines through the communication device, computing the allowable power usable by the electric motor on the basis of the own demanded power, the demanded power of the other electrically driven construction machine, and the allowable electric power of the electric power receiving facility, and controlling the electric motor such that a power consumption of the electric motor does not exceed the allowable power usable by the electric motor, it is possible to, in a case where a plurality of electrically driven construction machines operate simultaneously, perform work efficiently within an allowable electric power by distributing supplied electric power without a work imbalance between different machine bodies according to the respective demanded powers of the plurality of electrically driven construction machines while avoiding exceeding the allowable electric power that can be output by power receiving facility of a commercial electric power supply.

Advantageous of the Invention

According to the present invention, in a case where a plurality of electrically driven construction machines operate simultaneously, it is possible to avoid exceeding the allowable electric power that can be output by the electric power receiving facility of a commercial electric power supply as an external electric power supply while distributing supplied electric power without a work imbalance between different machine bodies according to the respective demanded powers of the plurality of electrically driven construction machines thereby make it possible to perform work efficiently within an allowable electric power of the electric power receiving facility.

BRIEF DESCRIPTION OF THE DRAWINGS

FIG. 7 is a table depicting the action states and action conditions of the electrically driven hydraulic excavator according to the present embodiment.

MODE FOR CARRYING OUT THE INVENTION

An embodiment of the present invention will be described with reference to the drawings by taking an electrically driven hydraulic excavator as an example of an application target of the present invention.

Configuration

Figure 1:
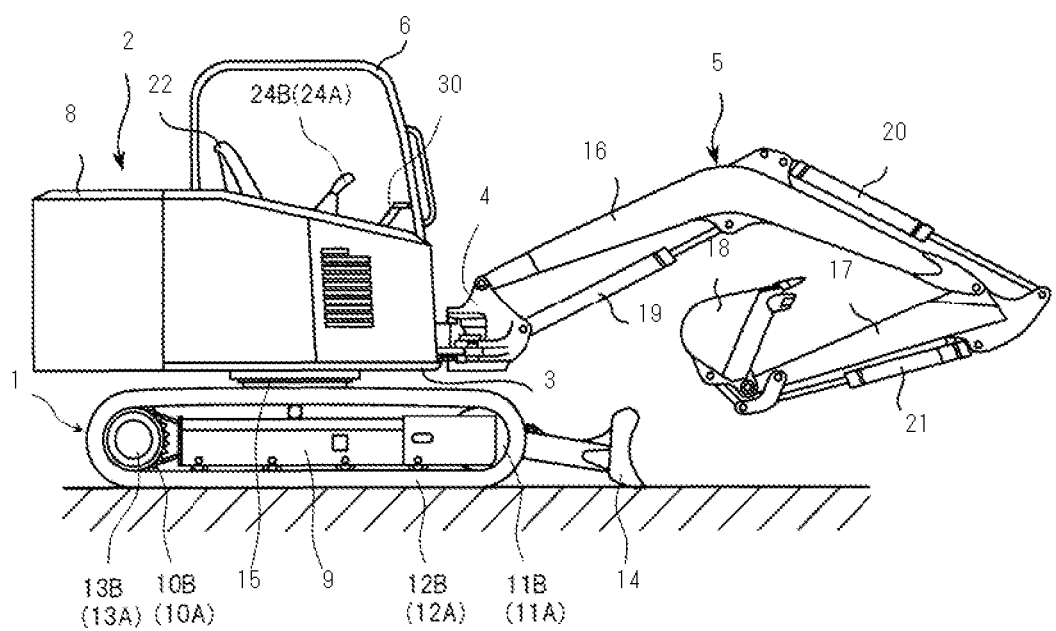
FIG. 1 is a side view depicting a general configuration of an electrically driven hydraulic excavator in one embodiment of the present invention.
Figure 2:
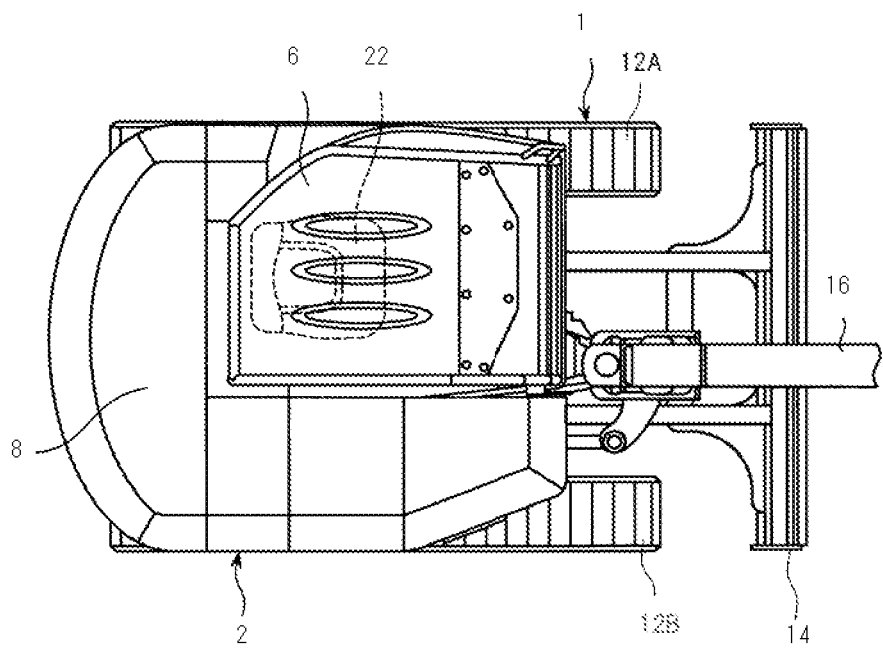
FIG. 2 is a top view of the same electrically driven hydraulic excavator.

FIG. 1 is a side view depicting a general configuration of an electrically driven hydraulic excavator in one embodiment of the present invention. FIG. 2 is a top view of the electrically driven hydraulic excavator. Incidentally, in the present specification, a front side (right side in FIG. 1), a rear side (left side in FIG. 1), a left side (far side facing a paper plane of FIG. 1), and a right side (near side facing the paper plane of FIG. 1) of a driver when the driver is seated in a cab seat of the electrically driven hydraulic excavator in a state depicted in FIG. 1 will be referred to simply as a front side, a rear side, a left side, and a right side.

Figure 4:
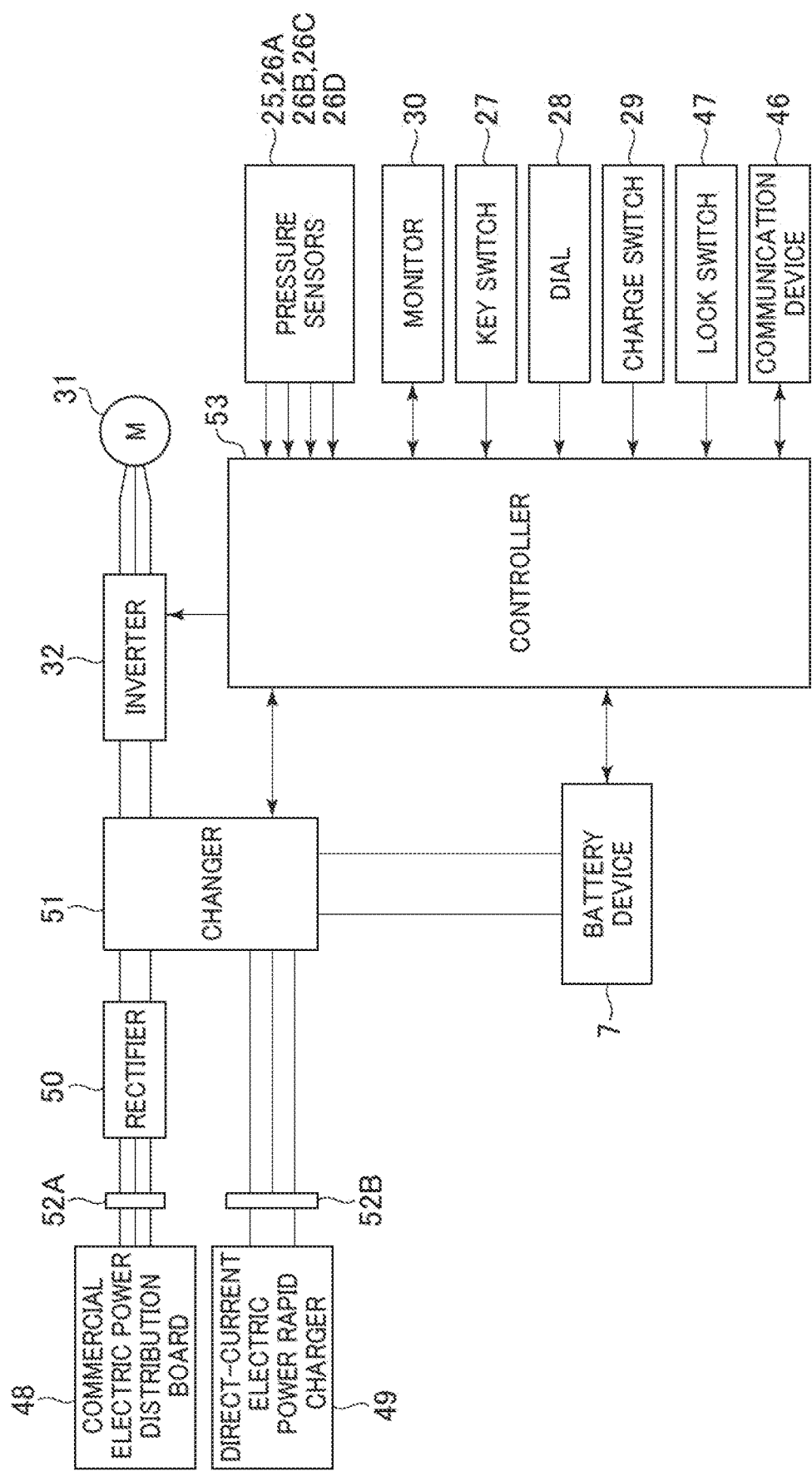
FIG. 4 is a block diagram depicting a configuration of an electric system in one embodiment of the present invention.
Figure 5:
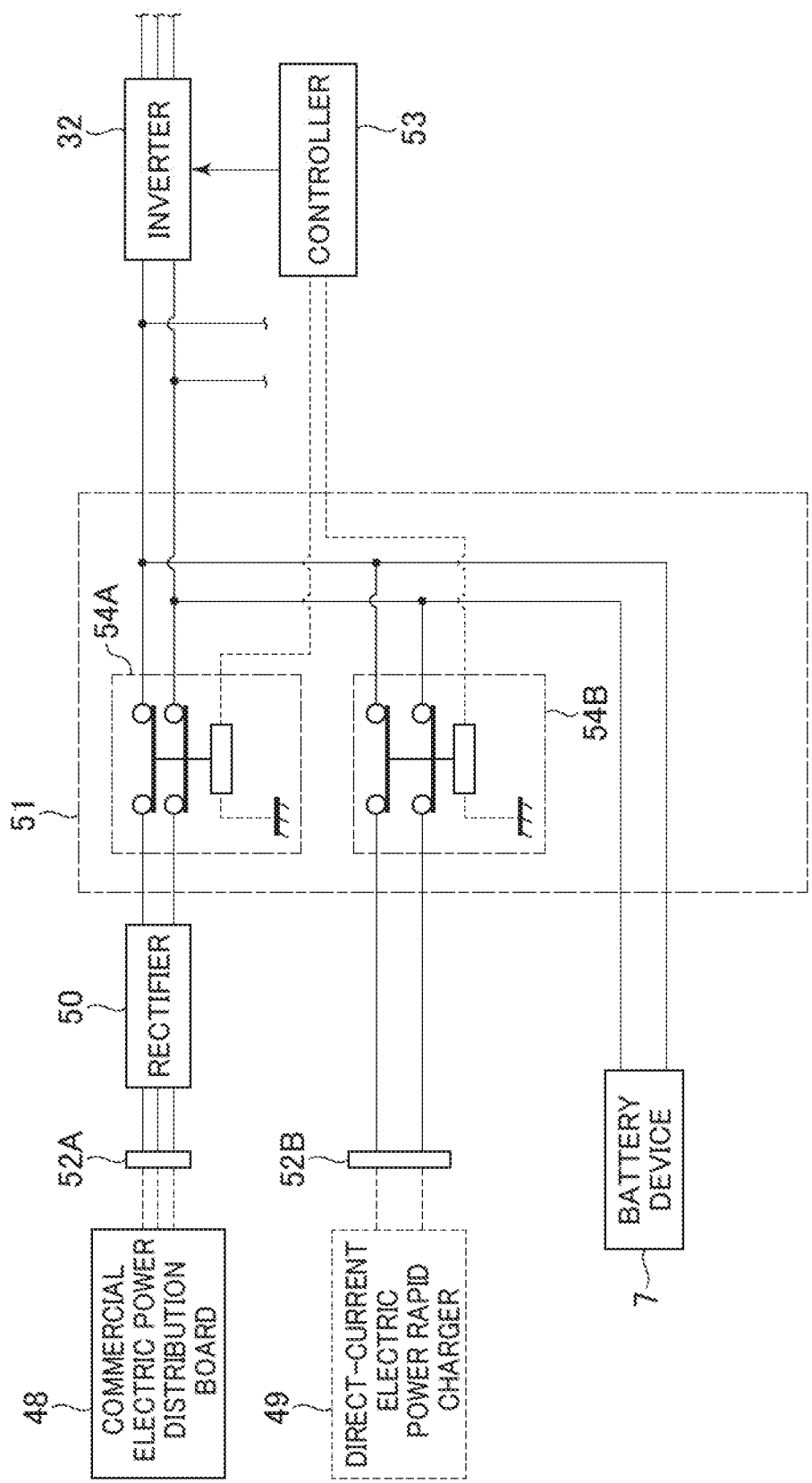
FIG. 5 is a diagram depicting a configuration of a changer together with related apparatuses.
Figure 6:
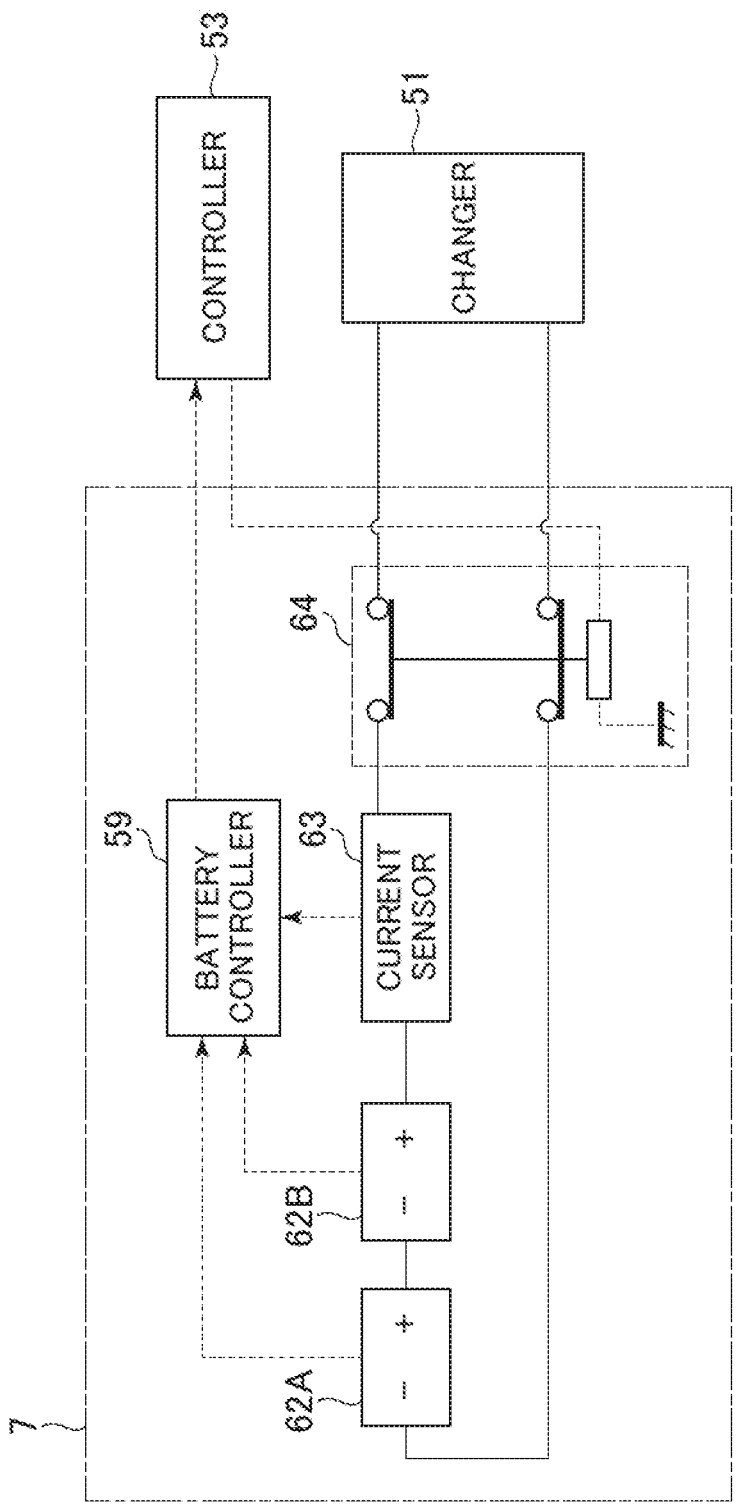
FIG. 6 is a diagram depicting a configuration of a battery device.

In FIG. 1 and FIG. 2, the electrically driven hydraulic excavator (mini-excavator having an operating mass of less than 6 tons in the present embodiment) includes: a crawler type lower track structure 1; an upper swing structure 2 swingably disposed above the lower track structure 1; a swing frame 3 constituting a lower substructure of the upper swing structure 2; a swing post 4 disposed in the front side of the swing frame 3 so as to be rotatable in a left-right direction; an articulated work device 5 coupled to the swing post 4 so as to be rotatable (elevatable) in an upward-downward direction; a canopy type cab 6 provided on the swing frame 3; and a driving battery unit mounting portion 8 provided in a rear side on the swing frame 3 and housing a battery device 7 (see FIGS. 4 to 6 to be described later).

The lower track structure 1 includes: a track frame 9 substantially in the shape of an H as viewed from above; a left and a right driving wheel 10A and 10B rotatably supported in the vicinities of rear ends of both of the left and right sides of the track frame 9; a left and a right driven wheel (idler) 11A and 11B rotatably supported in the vicinities of front ends of both of the left and right sides of the track frame 9; and a left and a right crawler 12A and 12B respectively stretched around the driving wheels 10A and 10B and the driven wheels 11A and 11B on the left and the right. The left driving wheel 10A (that is, the left crawler 12A) is rotated by the driving of a left travelling hydraulic motor 13A (see FIG. 3 to be described later). The right driving wheel 10B (that is, the right crawler 12B) is rotated by the driving of a right travelling hydraulic motor 13B.

An earth moving blade 14 is provided at the front side of the track frame 9 so as to be capable of moving up and down. The blade 14 is moved up and down by extension and contraction driving of a blade hydraulic cylinder (not depicted).

A swing wheel 15 is situated in a central portion of the track frame 9. The swing frame 3 is swingably provided through the swing wheel 15. The swing frame 3 (that is, the upper swing structure 2) is swung by the driving of a swing hydraulic motor (not depicted).

The swing post 4 is provided at the front side of the swing frame 3 so as to be rotatable in the left-right direction. The swing post 4 is rotated in the left-right direction by expansion and contraction driving of a swing hydraulic cylinder (not depicted). The work device 5 thereby swings left and right.

The work device 5 includes a boom 16 coupled to the swing post 4 so as to be rotatable in the upward-downward direction, an arm 17 coupled to the boom 16 so as to be rotatable in the upward-downward direction, and a bucket 18 coupled to the arm 17 so as to be rotatable in the upward-downward direction. The boom 16, the arm 17, and the bucket 18 are rotated in the upward-downward direction by a boom hydraulic cylinder 19, an arm hydraulic cylinder 20, and a bucket hydraulic cylinder 21. Incidentally, the bucket 18 is replaceable with an attachment (not depicted) incorporating an optional hydraulic actuator, for example.

The cab 6 is provided with a cab seat (sitting seat) 22 in which the driver is seated. A left travelling control lever 23A (see FIG. 3 to be described later) and a right travelling control lever (not depicted) are provided in front of the cab seat 22, the left travelling control lever 23A and the right travelling control lever being operated by hand or foot in forward and rearward directions to instruct operations of the left and right travelling hydraulic motors 13A and 13B (that is, operations of the left and right crawlers 12A and 12B). An optional operating pedal (not depicted) is provided in a foot part further left of the left travelling control lever 23A, the optional operating pedal being operated in the left and right directions to instruct operation of an optional hydraulic actuator (that is, operation of an attachment). A swing operating pedal (not depicted) is provided in a foot part further right of the right travelling control lever, the swing operating pedal being operated in the left and right directions to instruct operation of the swing hydraulic cylinder (that is, operation of the swing post 4).

A cross-operated arm and swing control lever 24A is provided in the left side of the cab seat 22, the arm and swing control lever 24A being operated in the forward and rearward directions to instruct operation of the arm hydraulic cylinder 20 (that is, operation of the arm 17), and being operated in the left and right directions to instruct operation of the swing hydraulic motor (that is, operation of the upper swing structure 2). A cross-operated boom and bucket control lever 24B is provided in the right side of the cab seat 22, the boom and bucket control lever 24B being operated in the forward-rearward direction to instruct operation of the boom hydraulic cylinder 19 (that is, operation of the boom 16), and being operated in the left-right direction to instruct operation of the bucket hydraulic cylinder 21 (that is, operation of the bucket 18). In addition, a blade control lever (not depicted) is provided in the right side of the cab seat 22, the blade control lever being operated in the forward-rearward direction to instruct operation of the blade hydraulic cylinder (that is, operation of the blade 14).

In addition, a gate lock lever (not depicted) is provided in the left side of the cab seat 22 (in other words, a platform of the cab 6), the gate lock lever being operated to a lock release position (specifically a lowered position obstructing the boarding and alighting of the driver) and a lock position (specifically a raised position allowing the boarding and alighting of the driver). In addition, a key switch 27, a dial 28, a charge switch 29 (see FIG. 4 to be described later), and the like are provided in the right side of the cab seat 22. Furthermore, a monitor 30 is provided in front of the right side of the cab seat 22.

Figure 3:
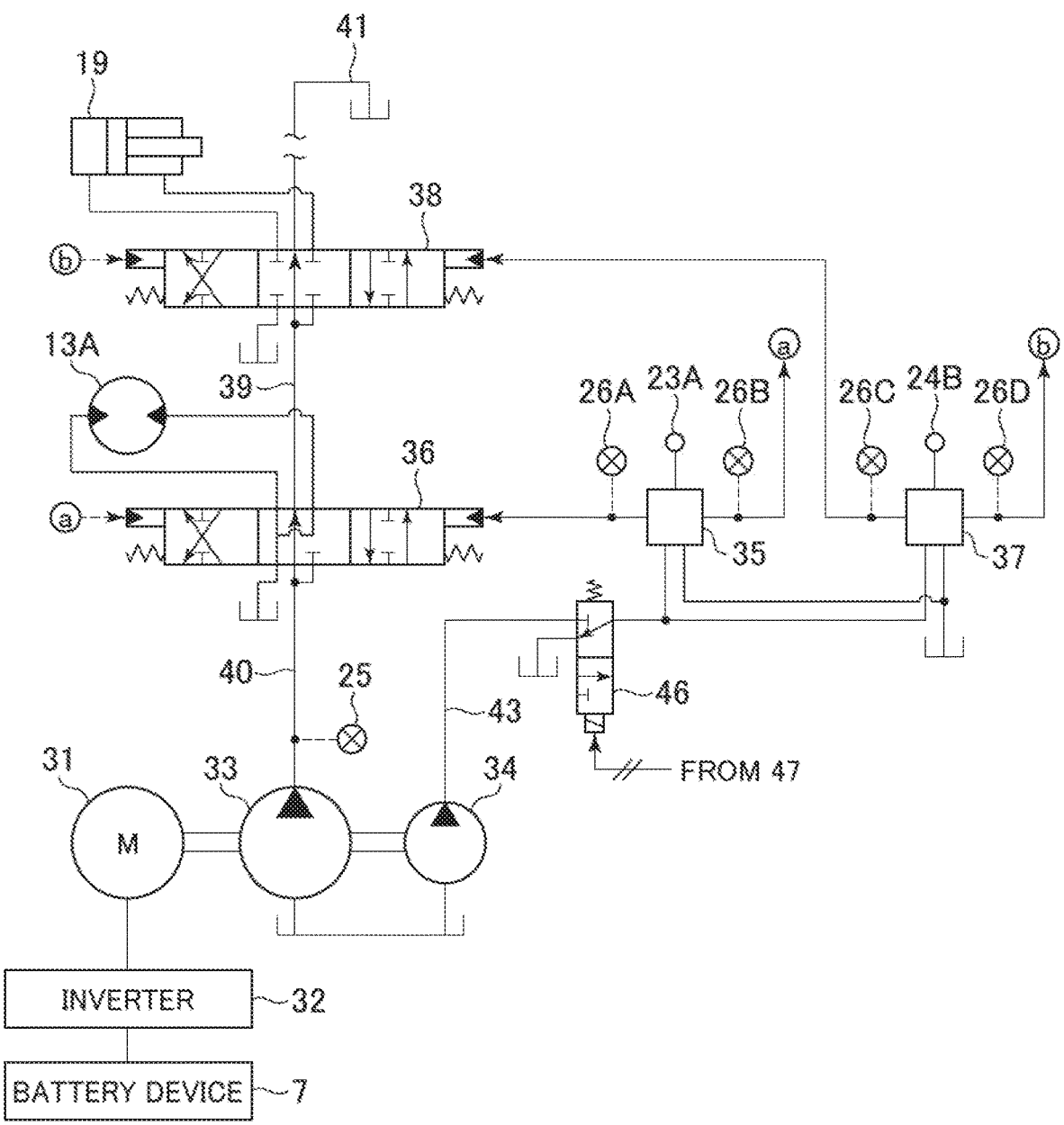
FIG. 3 is a hydraulic circuit diagram depicting a configuration of a hydraulic drive system included in the electrically driven hydraulic excavator.

FIG. 3 is a hydraulic circuit diagram depicting a configuration of a hydraulic drive system included in the above-described electrically driven hydraulic excavator. Incidentally, FIG. 3 depicts, as a representative, a configuration related to the left travelling hydraulic motor 13A and the boom hydraulic cylinder 19.

In FIG. 3, the hydraulic drive system includes: an electric motor 31; a battery device 7 as a power source of the electric motor 31; an inverter 32 that drives the electric motor 31 by controlling an electric power supplied to the electric motor 31; a hydraulic pump 33 and a pilot pump 34 driven by the electric motor 31; the above-described plurality of hydraulic actuators 13A, 19, . . . (hydraulic actuators other than the left travelling hydraulic motor 13A and the boom hydraulic cylinder 19 are not depicted) driven by a pressurized fluid delivered from the hydraulic pump 33; a plurality of directional control valves 36, 38, . . . (directional control valves other than a left travelling directional control valve 36 and a boom directional control valve 38 are not depicted) that control flows of the pressurized fluid supplied from the hydraulic pump 33 to the plurality of hydraulic actuators 13A, 19, . . . ; and a plurality of hydraulic pilot type operation devices 35, 37, . . . (operation devices other than a left travelling operation device 35 and a bucket and boom operation device 37 are not depicted) that give instructions for operation of the plurality of hydraulic actuators 13A, 19, . . . and generate pilot pressures (operation signals) for switching the plurality of directional control valves 36, 38, . . . .

The left travelling operation device 35 has the left travelling control lever 23A. The flow of the pressurized fluid from the hydraulic pump 33 to the left travelling hydraulic motor 13A is controlled according to an operation in the forward-rearward direction of the control lever 23A. The bucket and boom operation device 37 has the boom and bucket control lever 24B. The flow of the pressurized fluid from the hydraulic pump 33 to the boom hydraulic cylinder 19 is controlled according to an operation in the forward-rearward direction of the control lever 24B.

Pressure sensors 26A and 26B that detect pilot pressures (operation signals) generated by a plurality of pilot valves included in the operation device 35 are provided to a hydraulic line between the hydraulic pilot type operation device 35 and the left travelling directional control valve 36. Similarly, pressure sensors 26C and 26D that detect pilot pressures (operation signals) generated by a plurality of pilot valves included in the operation device 37 are provided to a hydraulic line between the operation device 37 and the boom directional control valve 38. Detection signals of the pressure sensors 26A and 26B and the pressure sensors 26A and 26B are input to a controller 53 (see FIG. 4 to be described later).

Incidentally, configurations of the hydraulic drive system which configurations are related to the right travelling hydraulic motor 13B, the arm hydraulic cylinder 20, the bucket hydraulic cylinder 21, the swing hydraulic motor, the swing hydraulic cylinder, and the blade hydraulic cylinder not depicted in FIG. 3 are substantially similar.

The left travelling directional control valve 36 and the boom directional control valve 38 and the other directional control valves not depicted are of a center bypass type, and each have a center bypass passage located on a center bypass line 39. The center bypass passage of each directional control valve is connected in series with the center bypass line 39. The center bypass passage communicates when a spool of each directional control valve is at a neutral position. The center bypass passage is interrupted when the spool of each directional control valve is switched to a switching position in the left side or the right side in FIG. 3. An upstream side of the center bypass line 39 is connected to a delivery line 40 of the hydraulic pump 33. A downstream side of the center bypass line 39 is connected to a tank line 41.

In addition, a pressure sensor 25 for detecting the pressure of the delivery line 40 (delivery pressure of the hydraulic pump 33) is provided to the delivery line 40 of the hydraulic pump 33. A detection signal of the pressure sensor 25 is input to the controller 53 (see FIG. 4 to be described later).

The left travelling directional control valve 36 is configured to be switched by a pilot pressure from the operation device 35. The operation device 35 has the above-described left travelling control lever 23A and a pair of pilot valves (not depicted) that generate a pilot pressure with the delivery pressure of the pilot pump 34 as a source pressure according to an operation in the forward-rearward direction of the control lever 23A. When the control lever 23A is operated from a neutral position to the front side, for example, a pilot pressure generated by one pilot valve according to an amount of the operation is output to a pressure receiving portion in the right side, in FIG. 3, of the left travelling directional control valve 36, and the left travelling directional control valve 36 is thereby switched to the switching position in the right side in FIG. 3. Consequently, the left travelling hydraulic motor 13A rotates in a forward direction, and the driving wheel 10 and the crawler 12 on the left rotate in the forward direction. On the other hand, when the control lever 23A is operated from the neutral position to the rear side, for example, a pilot pressure generated by the other pilot valve is output to a pressure receiving portion in the left side, in FIG. 3, of the left travelling directional control valve 36 according to an amount of the operation, and the left travelling directional control valve 36 is thereby switched to the switching position in the left side in FIG. 3. Consequently, the left travelling hydraulic motor 13A rotates in a rearward direction, and the driving wheel 10 and the crawler 12 on the left rotate in the rearward direction.

The pilot pressures generated by the pilot valves of the operation device 35 are increased in proportion to the operation amount. Thus, the operation amount of the operation device 35 and the switching direction of the left travelling directional control valve 36 can be measured on the basis of the detection values of the pressure sensors 26A and 26B.

The boom directional control valve 38 is configured to be switched by a pilot pressure from the operation device 37. The operation device 37 has the boom and bucket control lever 24B and a pair of pilot valves not depicted or the like that generate a pilot pressure with the delivery pressure of the pilot pump 34 as a source pressure according to an operation in the forward-rearward direction of the control lever 24B. When the control lever 24B is operated from a neutral position to the front side, for example, a pilot pressure generated by one pilot valve according to an amount of the operation is output to a pressure receiving portion in the right side, in FIG. 3, of the boom directional control valve 38, and the boom directional control valve 38 is thereby switched to the switching position in the right side in FIG. 3. Consequently, the boom hydraulic cylinder 19 is contracted, and the boom 16 is lowered. On the other hand, when the control lever 24B is operated to the rear side, for example, a pilot pressure generated by the other pilot valve according to an amount of the operation is output to a pressure receiving portion in the left side, in FIG. 3, of the boom directional control valve 38, and the boom directional control valve 38 is thereby switched to the switching position in the left side in FIG. 3. Consequently, the boom hydraulic cylinder 19 is extended, and the boom 16 is raised.

The pilot pressures generated by the pilot valves within the operation device 37 are increased in proportion to the operation amount. Thus, the operation amount of the operation device 37 and the switching direction of the boom directional control valve 38 can be measured from the detection values of the pressure sensors 26C and 26D.

A delivery line 43 of the pilot pump 34 is provided with a pilot relief valve (not depicted) that holds the delivery pressure of the pilot pump 34 constant. The delivery line 43 of the pilot pump 34 is also provided with a lock valve 45. The lock valve 45 is configured to be switched according to an operation of the above-described gate lock lever. Specifically, a lock switch 47 (see FIG. 4 to be described later) is provided which is set in a closed state when the gate lock lever is in the lock release position (lowered position), and is set in an opened state when the gate lock lever is in the lock position (raised position). When the lock switch 47 is set in the closed state, for example, a solenoid portion of the lock valve 45 is energized through the lock switch 47, and the lock valve 45 is switched to a position in a lower side in FIG. 3. Consequently, the delivery pressure of the pilot pump 34 is guided to the operation devices 35, 37, and the like by communicating the delivery line 43 of the pilot pump 34. When the lock switch 47 is set in the opened state, on the other hand, the solenoid portion of the lock valve 45 is not energized, and the lock valve 45 is set in a neutral position in an upper side in FIG. 3 due to the biasing force of a spring. The delivery line 43 of the pilot pump 34 is thereby interrupted. As a result, no pilot pressure is generated even when the operation devices 35, 37, and the like are operated, so that the hydraulic actuators are prevented from operating.

FIG. 4 is a block diagram depicting a configuration of an electric system in one embodiment of the present invention. The electric system in the present embodiment has a function of supplying and charging the battery device 7 with an electric power supplied from a distribution board 48 (hereinafter referred to as a commercial electric power distribution board as appropriate) connected to an electric power receiving facility 80 (see FIG. 10) of a commercial electric power supply or a direct-current power rapid charger 49 and a function of operating the electrically driven hydraulic excavator by supplying electric power from the commercial electric power distribution board 48 or the battery device 7 to the electric motor 31 through the inverter 32.

In order to perform the above-described functions, the electric system includes the monitor 30, a communication device 46, and the controller 53.

As described earlier, the controller 53 is supplied with signals from the pressure sensor 25, the pressure sensors 26A and 26B, and the pressure sensors 26A and 26B, and is supplied with signals from the key switch 27, the dial 28, the charge switch 29, and the lock switch 47.

The monitor 30 displays an action state, a state of charge (SOC) indicating a remaining capacity of the battery device 7, a present time, or the like according to input from the controller 53. In addition, the monitor 30 has input means such as a switch operable by a worker. By operating the input means, it is possible to send various information to the controller 53, and set necessary information in the controller 53.

The controller 53 is also connected to the communication device 46. The communication device 46 is a short-range wireless communication module (wireless communication device). The communication device 46 serves as means for communicating with other electrically driven hydraulic excavators (here, the other electrically driven hydraulic excavators similarly include a communication device 46) connected to a same network. The controller 53 receives data from the other electrically driven hydraulic excavators and transmit data to the other electrically driven hydraulic excavators through the communication device 46.

In addition, the controller 53 is connected to a battery controller 59 within the battery device 7 to be described later, and monitors a battery state within the battery device 7 (see FIG. 6 to be described later).

The inverter 32 controls a voltage applied to the electric motor 31 (more specifically, the frequency of the supplied voltage) and thereby controls the revolution speed of the electric motor 31 according to a revolution speed control command from the controller 53.

In addition, the controller 53 switches between connection and interruption of relays 54A and 54B within a changer 51 (see FIG. 5 to be described later), and thereby controls the supply of power.

FIG. 5 is a diagram depicting a configuration of the changer 51 together with related apparatuses. Alternating-current power supplied from the commercial electric power distribution board 48 through a power receiving connector 52A is converted into a direct current in a rectifier 50. The direct current is supplied to the changer 51. Direct-current power supplied from the direct-current power rapid charger 49 through a power receiving connector 52B is supplied to the changer 51 as it is. The changer 51 has the relays 54A and 54B. The rectifier 50 is connected to the relay 54A. The power receiving connector 52B is connected to the relay 54B. Here, the controller 53 turns the relay 54A on, and turns the relay 54B off, so that the electric power from the commercial electric power distribution board 48, that is, the direct-current power converted from an alternating current by the rectifier 50 is supplied to a high voltage circuit. Similarly, the direct-current electric power from the direct-current power rapid charger 49 is supplied to the high voltage circuit by turning the relay 54A off, and turning the relay 54B on. In addition, the battery device 7 is connected to the high voltage circuit within the changer 51.

FIG. 6 is a diagram depicting a configuration of the battery device 7. The battery device 7 includes a battery module 62 formed by connecting a plurality of battery cells 62A, 62B, . . . in series with each other and the battery controller 59. The battery cells 62A, 62B, . . . are monitored and controlled by a cell controller (not depicted) provided within the battery module 62. The battery controller 59 is supplied with a state quantity such as a cell voltage, or a cell temperature detected by the cell controller, and periodically transmits the state quantity to the controller 53.

In addition, a current sensor 63 is provided in a positive electrode side of the battery module 62. The current sensor 63 detects an input-output current value of the battery device 7. The input-output current value is transmitted to the controller 53 through the battery controller 59. The controller 53 computes the temperature of the battery device, a total voltage, an SOC, and a supplied electric power from the information received from the battery controller 59. In addition, at a time of a stop of the machine body and a time of an abnormality, the controller 53 turns a relay 64 off, and thereby interrupts connection between the battery device 7 and the circuit. In addition, the computed SOC of the battery device 7 is displayed on the monitor 30 according to a display signal from the controller 53.

Returning to FIG. 4, the key switch 27 is formed by a key cylinder and a key that can be inserted into the key cylinder. The key switch 27 is configured to output a signal according to a rotational operation position (an OFF position, an ON position, or a START position) of the key. The dial 28 gives an instruction for a target revolution speed of the electric motor 31, and is configured to output a signal of the target revolution speed corresponding to the rotational operation position. The charge switch 29 gives an instruction for turning battery charge control on or off, and is configured to output a signal corresponding to an operation position thereof (an OFF position or an ON position).

The electrically driven hydraulic excavator according to the present embodiment has two action states, that is, an operational state and a charging state.

FIG. 7 is a table depicting the action states and action conditions of the electrically driven hydraulic excavator according to the present embodiment. In the present embodiment, a state in which power is supplied to the inverter 32, and the electric motor 31 and the hydraulic pump 33 are rotating will be referred to as an operation mode. A state in which power is supplied to the battery device 7, and the electric motor 31 is stopped, on the other hand, will be referred to as a charge mode. The charge mode and the operation mode will be described in the following.

<Charge Mode>

The controller 53, for example, performs battery charge control when the controller 53 determines that the key switch 27 is at the OFF position on the basis of the voltage value of a signal from the key switch 27, the controller 53 determines that the charge switch 29 is operated to the ON position on the basis of the voltage value of a signal from the charge switch 29, and the controller 53 determines that a cable from the commercial electric power distribution board 48 or the direct-current power rapid charger 49 is connected through the power receiving connector 52A or 52B on the basis of the voltage value of a signal from a cable connection detecting circuit (not depicted).

When the commercial electric power distribution board 48 is connected, the controller 53 performs control so as to set the relay 54A within the changer 51 in a closed state, and set the relay 54B within the changer 51 in an opened state. In addition, when the direct-current power rapid charger 49 is connected, the controller 53 performs control so as to set the relay 54A within the changer 51 in an opened state, and set the relay 54B within the changer 51 in a closed state. Direct-current power is supplied from the relay 54A or the relay 54B in a closed state to the battery device 7 through the high voltage circuit.

In addition, when the commercial electric power distribution board 48 and the rapid charger 49 are connected simultaneously, each of the relays 54A and 54B is controlled to an opened state for safety.

In addition, the controller 53, for example, stops charging by controlling the relay 54A and the relay 54B to an opened state when the controller 53 determines that the charge switch 29 is operated to the OFF position on the basis of the voltage value of a signal from the charge switch 29 during charging of the battery device 7.

Alternatively, when the SOC of the battery device 7, the SOC being computed by the controller 53, exceeds a predetermined threshold value, it is determined that the battery is fully charged, and the charging is stopped by similarly controlling the relay 54A and the relay 54B to an opened state.

<Operation Mode>
<<Battery Operation Mode>>

The operation mode using the battery device 7 will be described.

The controller 53 is, for example, configured to start driving the electric motor 31 by an electric power from the battery device 7 when the controller 53 determines that the key switch 27 is operated to the START position on the basis of the voltage value of a signal from the key switch 27, the controller 53 determines that the charge switch 29 is operated to the OFF position on the basis of the voltage value of a signal from the charge switch 29, and the controller 53 determines that cables from the commercial electric power distribution board 48 and the direct-current power rapid charger 49 are not connected through the power receiving connector 52A or 52B on the basis of the voltage value of a signal from the cable connection detecting circuit (not depicted). The driving of the electric motor 31 by the electric power from the battery device 7 may be started when it is further determined that the gate lock lever is at the lock release position on the basis of the voltage value of a signal from the lock switch 47.

At this time, the controller 53 performs control in a direction of setting the relays 54A and 54B within the changer 51 in an opened state, and thus interrupting circuit connection to the commercial electric power distribution board 48 and the direct-current power rapid charger 49.

In addition, the controller 53 outputs a command of the target revolution speed indicated by the dial 28 to the inverter 32. The inverter 32 is configured to control a voltage applied to the electric motor 31 in response to this command so that an actual revolution speed of the electric motor 31 becomes the target revolution speed.

In addition, the controller 53, for example, outputs a stop command to the inverter 32 when the controller 53 determines that the key switch 27 is operated to the OFF position on the basis of the voltage value of a signal from the key switch 27 during the driving of the electric motor 31. The inverter 32 is configured to stop the electric motor 31 in response to this command.

Alternatively, when the SOC of the battery device 7, the SOC being computed by the controller 53, falls below a predetermined threshold value, the controller 53 determines that the remaining battery capacity is decreased, and outputs an output limiting command to the inverter 32. There are levels of output limitation according to the SOC. The inverter 32 is configured to control the revolution speed of the electric motor 31 according to this command, and ultimately stop the electric motor 31 when the SOC falls below an SOC threshold value at which it is determined that there is a safety problem.

<<Commercial Electric Power Operation Mode>>

The operation mode using an electric power supplied from the commercial electric power distribution board 48 will next be described.

The controller 53 is, for example, configured to start driving the electric motor 31 by an electric power from the commercial electric power distribution board 48 when the controller 53 determines that the key switch 27 is operated to the START position on the basis of the voltage value of a signal from the key switch 27, the controller 53 determines that the charge switch 29 is operated to the OFF position on the basis of the voltage value of a signal from the charge switch 29, and the controller 53 determines that the cable from the commercial electric power distribution board 48 is connected but the cable from the direct-current power rapid charger 49 is not connected through the power receiving connector 52A or 52B on the basis of the voltage value of a signal from the cable connection detecting circuit (not depicted). The driving of the electric motor 31 by the electric power from the commercial electric power distribution board 48 may be started when it is further determined that the gate lock lever is at the lock release position on the basis of the voltage value of a signal from the lock switch 47.

At this time, the controller 53 performs control in a direction of connecting the commercial electric power distribution board 48 to the high voltage circuit and supplying electric power to the high voltage circuit by switching the relay 54A within the changer 51 to a closed state and switching 54B within the changer 51 to an opened state, and interrupting circuit connection to the direct-current power rapid charger 49.

In addition, the controller 53 computes a revolution speed control command Nd on the basis of the target revolution speed indicated by the dial 28 and a motor demanded revolution speed Ndr to be described later. The controller 53 controls a voltage applied to the electric motor 31 by outputting the revolution speed control command Nd to the inverter 32. The controller 53 thereby controls the revolution speed of the electric motor 31.

In addition, the controller 53, for example, outputs a stop command to the inverter 32 when the controller 53 determines that the key switch 27 is operated to the OFF position on the basis of the voltage value of a signal from the key switch 27 during the driving of the electric motor 31. The inverter 32 is configured to stop the electric motor 31 in response to this command.

Figure 8:
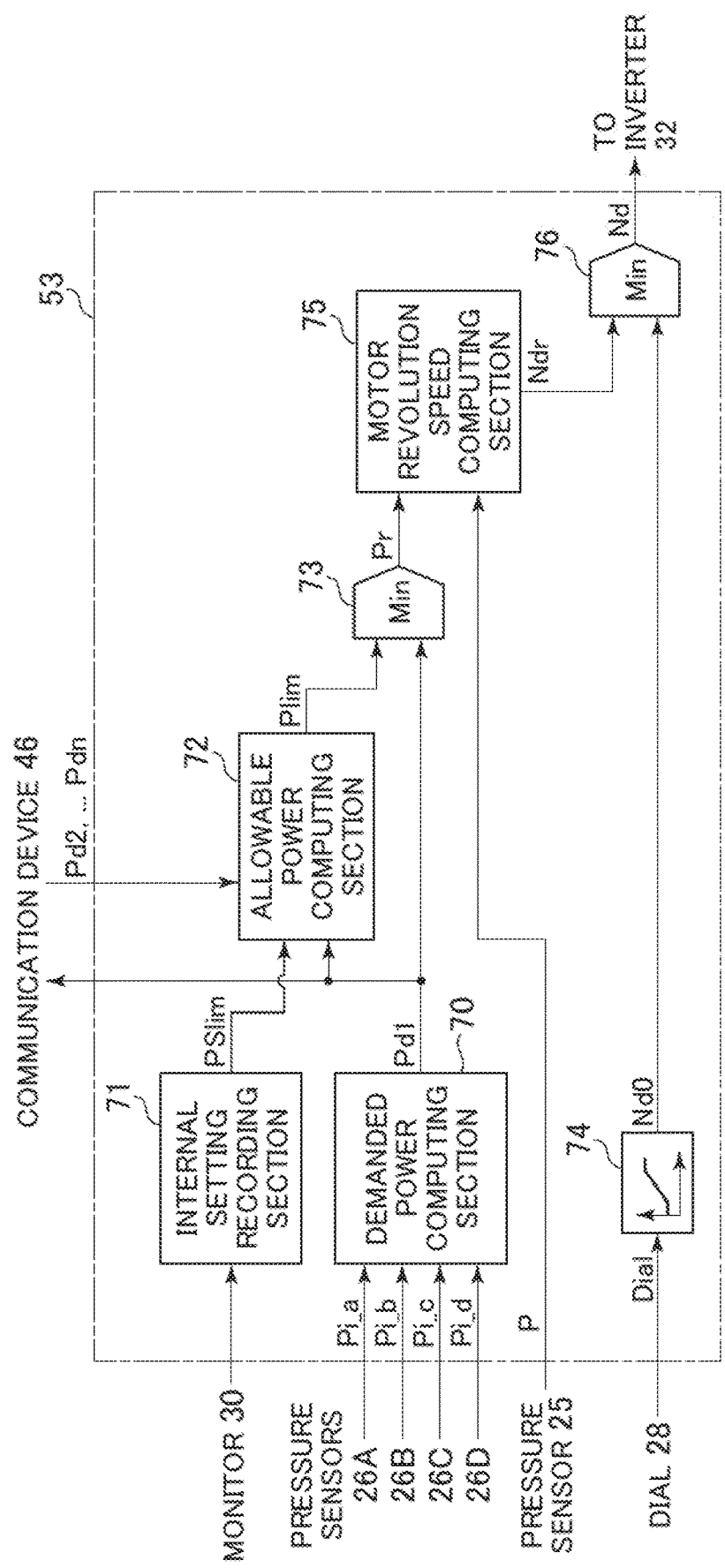
FIG. 8 is a functional block diagram depicting processing functions of a controller when control of driving an electric motor in a commercial electric power driving mode is performed.

FIG. 8 is a functional block diagram depicting processing functions of the controller 53 when control of driving the electric motor 31 in a commercial electric power driving mode is performed.

As described above, the electrically driven hydraulic excavator according to the present embodiment can supply power to the electric motor 31 from the electric power receiving facility 80 (see FIG. 10) of the commercial electric power supply through the distribution board 48. Therefore, the electrically driven hydraulic excavator according to the present embodiment includes a commercial electric power driving control system. The commercial electric power driving control system includes: the communication device 46 that transmits and receives data to and from other electrically driven construction machines sharing the electric power receiving facility; and the controller 53. The controller 53 has functions of computing an own demanded power Pd1 for driving the plurality of hydraulic actuators 13A, 19, . . . on the basis of operation signals of the operation devices 35, 37, . . . , transmitting the own demanded power Pd1 to the other electrically driven construction machines through the communication device 46, and receiving demanded powers Pd2, Pd3, . . . , Pdn computed in the other electrically driven construction machines through the communication device 46.

In addition, the controller 53 calculates an allowable power Plim as a power limit value usable by the electric motor 31 on the basis of the own demanded power Pd1, the demanded powers Pd2, Pd3, . . . , Pdn of the other electrically driven construction machines received through the communication device 46, and an allowable electric power of the electric power receiving facility 80 (see FIG. 10) of the commercial electric power supply, and controls the electric motor 31 such that a power consumption of the electric motor 31 does not exceed the allowable power Plim.

By thus controlling the electric motor 31, in a case where a plurality of electrically driven construction machines operate simultaneously, it is possible to avoid exceeding the allowable electric power that can be output by the electric power receiving facility 80 of the commercial electric power supply as an external electric power supply while distributing supplied electric power without a work imbalance between different machine bodies according to the respective demanded powers Pd1, Pd2, Pd3, . . . , Pdn of the plurality of electrically driven construction machines thereby make it possible to perform work efficiently within the allowable electric power of the electric power receiving facility 80.

In FIG. 8, in order to perform the above-described functions, the controller 53 includes a demanded power computing section 70, an internal setting recording section 71, an allowable power computing section 72, a minimum value selecting section 73, and a motor revolution speed computing section 75.

The demanded power computing section 70 is supplied with signals from the pressure sensors 26A and 26B detecting the pilot pressures generated by the pilot valves of the operation device 35 and the pressure sensors 26C and 26D detecting the pilot pressures generated by the pilot valves of the operation device 37 and signals from pressure sensors detecting the pilot pressures generated by the pilot valves of other operation devices not depicted, and computes the own demanded power Pd1 for driving the hydraulic actuators 13A, 19, . . . on the basis of the pilot pressures indicated by those signals. The demanded power Pd1 is sent to the allowable power computing section 72 and the minimum value selecting section 73. The demanded power Pd1 is also sent to the communication device 46 connected to the controller 53, and is transmitted to the other electrically driven hydraulic excavators through the communication device 46.

Incidentally, while the present embodiment represents a case where the operation devices are of a hydraulic pilot type and the operation signals are pilot pressures, the operation devices may, for example, be of an electric type. In that case, the operation signals are electric signals, and the demanded power computing section 70 may compute the own demanded power Pd1 directly using the electric signals input to the controller 53.

In addition, the demanded power computing section 70 may be supplied with the detection signal of the pressure sensor 25 in addition to the operation signals, and compute the own demanded power Pd1 on the basis of the operation signals and the delivery pressure of the hydraulic pump 33.

The internal setting recording section 71 is supplied with setting information from the monitor 30, and records the setting information therein. Here, the worker inputs the allowable electric power of the electric power receiving facility 80 (see FIG. 10) of the commercial electric power supply, the allowable electric power being determined in advance on the basis of an electric power contracted with an electric power supplier, by operating a switch provided to the monitor 30 or the like. The monitor 30 outputs the allowable electric power to the internal setting recording section 71. The internal setting recording section 71 computes an electric power supply allowable power PSlim of the electric power receiving facility 80 by multiplying the allowable electric power by a power conversion coefficient, and records the electric power supply allowable power PSlim as setting information. Incidentally, the calculation of obtaining the electric power supply allowable power PSlim from the allowable electric power of the electric power receiving facility 80 of the commercial electric power supply may be performed in the monitor 30.

The allowable power computing section 72 is supplied with the own demanded power Pd1 computed in the demanded power computing section 70, the electric power supply allowable power PSlim recorded in the internal setting recording section 71, and the demanded powers Pd2, Pd3, . . . , Pdn from the other electrically driven hydraulic excavators, the demanded powers Pd2, Pd3, . . . , Pdn being received by the communication device 46, and computes the allowable power Plim of the electric motor 31 usable by the own machine body.

Here, the other electrically driven hydraulic excavators that transmit and receive data by the communication devices 46 also have a controller similar to the controller 53 depicted in FIG. 8. The demanded power computing sections of these controllers compute the demanded powers Pd2, Pd3, . . . , Pdn of the respective machine bodies. In the present specification, the demanded power Pd1 computed in the demanded power computing section 70 depicted in FIG. 8 may be referred to as own demanded power as appropriate to be distinguished from these demanded powers Pd2, Pd3, . . . , Pdn.

The demanded power Pd1 computed by the demanded power computing section 70 and the allowable power Plim computed by the allowable power computing section 72 are guided to the minimum value selecting section 73. The minimum value selecting section 73 selects the value of the lower of the allowable power Plim and the demanded power Pd1 as a target demanded power Pr.

The motor revolution speed computing section 75 is supplied with the target demanded power Pr and a signal from the pressure sensor 25 that detects a pressure P of the delivery line 40 of the hydraulic pump 33, and computes a motor demanded revolution speed Ndr on the basis of the target demanded power Pr and the pressure P.

A target revolution speed computation table 74 is supplied with an indication signal corresponding to the rotational operation position from the dial 28, and computes a target revolution speed Nd0 of the electric motor 31 according to the indication signal of the dial 28. Set in the target revolution speed computation table 74 are characteristics of the target revolution speed corresponding to the indication signal (rotational operation position) of the dial 28.

The motor demanded revolution speed Ndr of the motor revolution speed computing section 75 and the target revolution speed Nd0 computed in the target revolution speed computation table 74 are input to a minimum value selecting section 76. The minimum value selecting section 76 selects, as a revolution speed control command Nd, the value of the lower of the motor demanded revolution speed Ndr and the target revolution speed Nd0.

The revolution speed control command Nd is output to the inverter 32. The inverter 32 controls the voltage applied to the electric motor 31 according to the revolution speed control command Nd, and thereby controls the revolution speed of the electric motor 31 so that the actual revolution speed of the electric motor 31 becomes the revolution speed control command Nd.

Figure 9:
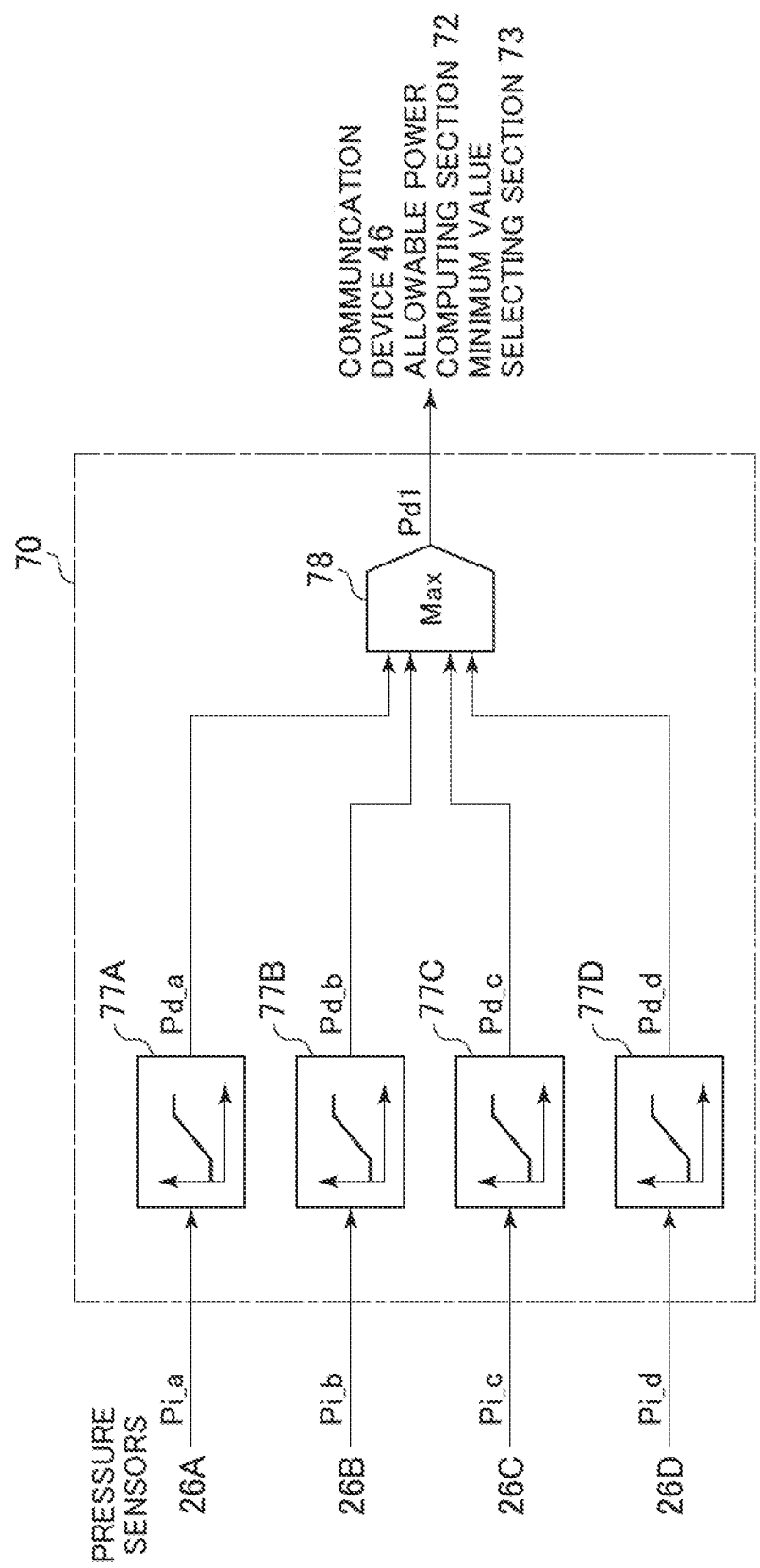
FIG. 9 is a functional block diagram depicting processing functions of a demanded power computing section.

FIG. 9 is a functional block diagram depicting processing functions of the demanded power computing section 70. The demanded power computing section 70 includes tables 77A, 77B, 77C, and 77D and a maximum value selecting section 78.

The tables 77A, 77B, 77C, and 77D are respectively supplied with signals from the pressure sensors 26A, 26B, 26C, and 26D, and compute demanded powers Pd_a, Pd_b, Pd_c, and Pd_d.

Set in the tables 77A, 77B, 77C, and 77D are characteristics of respective demanded powers corresponding to operation amounts of the control levers of the operation devices 35 and 37 that determine demanded actuation amounts of the hydraulic actuators 13A, 19, . . . (the pilot pressures Pi_a, Pi_b, Pi_c, and Pi_d detected by the pressure sensors 26A, 26B, 26C, and 26D). The demanded powers Pd_a, Pd_b, Pd_c, and Pd_d corresponding to the operation amounts of the control levers are computed by referring to the pilot pressures Pi_a, Pi_b, Pi_c, and Pi_d detected by the pressure sensors 26A, 26B, 26C, and 26D in the tables 77A, 77B, 77C, and 77D. Characteristics of the demanded powers set in the tables 77A, 77B, 77C, and 77D are determined in advance for respective specifications of the machine body.

The demanded powers Pd_a, Pd_b, Pd_c, and Pd_d computed in the tables 77A, 77B, 77C, and 77D are guided to the maximum value selecting section 78. A largest value of the demanded powers Pd_a, Pd_b, Pd_c, and Pd_d is selected and output as the demanded power Pd1.

Thus, the controller 53 computes the own demanded power Pd1 in the demanded power computing section 70 on the basis of the pilot pressures Pi_a, Pi_b, Pi_c, and Pi_d detected by the plurality of pressure sensors 26A, 26B, 26C, and 26D.

Incidentally, the demanded power computing section 70 may include an adding section in place of the maximum value selecting section 78, and compute the demanded power Pd1 by adding together the demanded powers Pd_a, Pd_b, Pd_c, and Pd_d.

The allowable power computing section 72 computes the allowable power Plim by Equation (1) depicted below.

[Math 1]

$$Plim = PSlim \times \frac{Pd1}{\sum (Pd1, Pd2, Pd3 \ldots, Pdn)} \quad (1)$$

In Equation (1), a first term on a right side is the electric power supply allowable power PSlim set in the internal setting recording section 71. In a second term on the right side, a denominator is a sum of the demanded powers Pd1, Pd2, Pd3, . . . , Pdn (total demanded power) of the electrically driven hydraulic excavators operating with the electric power supplied from the electric power receiving facility 80 of the same commercial electric power supply. The demanded powers Pd1, Pd2, Pd3, . . . , Pdn are values calculated in the demanded power computing sections 70 of the controllers 53 included in the respective machine bodies of the electrically driven hydraulic excavators, and are included in data received by the communication device 46 included in each machine body. In addition, a numerator is the own demanded power Pd1 demanded by the electrically driven hydraulic excavator according to the present embodiment described above. Hence, the second term represents a ratio of the power (own demanded power) Pd1 demanded by the machine body in question to the total demanded power of the electrically driven hydraulic excavators operating with the electric power supplied from the same electric power receiving facility 80 of the commercial electric power supply.

A result of distributing the electric power supply allowable power PSlim that can be output by the allowable electric power of the electric power receiving facility 80 of the commercial electric power supply according to the ratio of the demanded power of the electrically driven hydraulic excavator using the electric power receiving facility 80 is the allowable power Plim.

Thus, in the allowable power computing section 72, the controller 53 computes the ratio of the own demanded power Pd1 to the total demanded power of the own demanded power Pd1 and the demanded powers Pd2, Pd3, . . . , Pdn of the other electrically driven construction machines, the demanded powers Pd2, Pd3, . . . , Pdn being received through the communication device 46, and computes the allowable power Plim on the basis of the allowable electric power of the electric power receiving facility 80 of the commercial electric power supply and the above-described ratio.

In addition, the controller 53 sets the electric power supply allowable power PSlim computed on the basis of the allowable electric power of the electric power receiving facility 80 of the commercial electric power supply in the internal setting recording section 71 in advance, and computes the allowable power Plim by multiplying the electric power supply allowable power PSlim by the ratio of the own demanded power Pd1.

The motor revolution speed computing section 75 calculates a demanded revolution speed Ndr by Equation (2) depicted below.

[Math 2]

$$Ndr = 60 \times 10^3 \times \frac{Pr}{P \times \mu m \times qm} \quad (2)$$

Where, Nmin≤Ndr≤Nmax

In the right side of Equation (2), μm in a denominator of a third term denotes mechanical efficiency of the hydraulic pump 33, and qm denotes a capacity of the hydraulic pump 33, that is, an amount of oil delivered per rotation of the hydraulic pump. In addition, the demanded revolution speed Ndr is limited between a minimum revolution speed Nmin and a maximum revolution speed Nmax determined by specifications of the electric motor 31.

In Equation (2), Pr as a numerator of the third term is the target demanded power in which the allowable electric power of the electric power receiving facility 80 (see FIG. 10) of the commercial electric power supply is taken into consideration, the target demanded power being selected as the value of the lower of the own demanded power Pd1 and the allowable power Plim in the minimum value selecting section 73. The demanded revolution speed Ndr is computed on the basis of the target demanded power Pr and the present pressure of the hydraulic pump 33, that is, the detected value P of the pressure sensor 25.

Thus, the controller 53 selects the value of the smaller of the own demanded power Pd1 and the allowable power Plim as the target demanded power Pr in the minimum value selecting section 73, computes the demanded revolution speed Ndr of the electric motor 31 in the motor revolution speed computing section 75 on the basis of the target demanded power Pr, and controls the revolution speed of the electric motor 31 on the basis of the demanded revolution speed Ndr.

Operation

Figure 10:
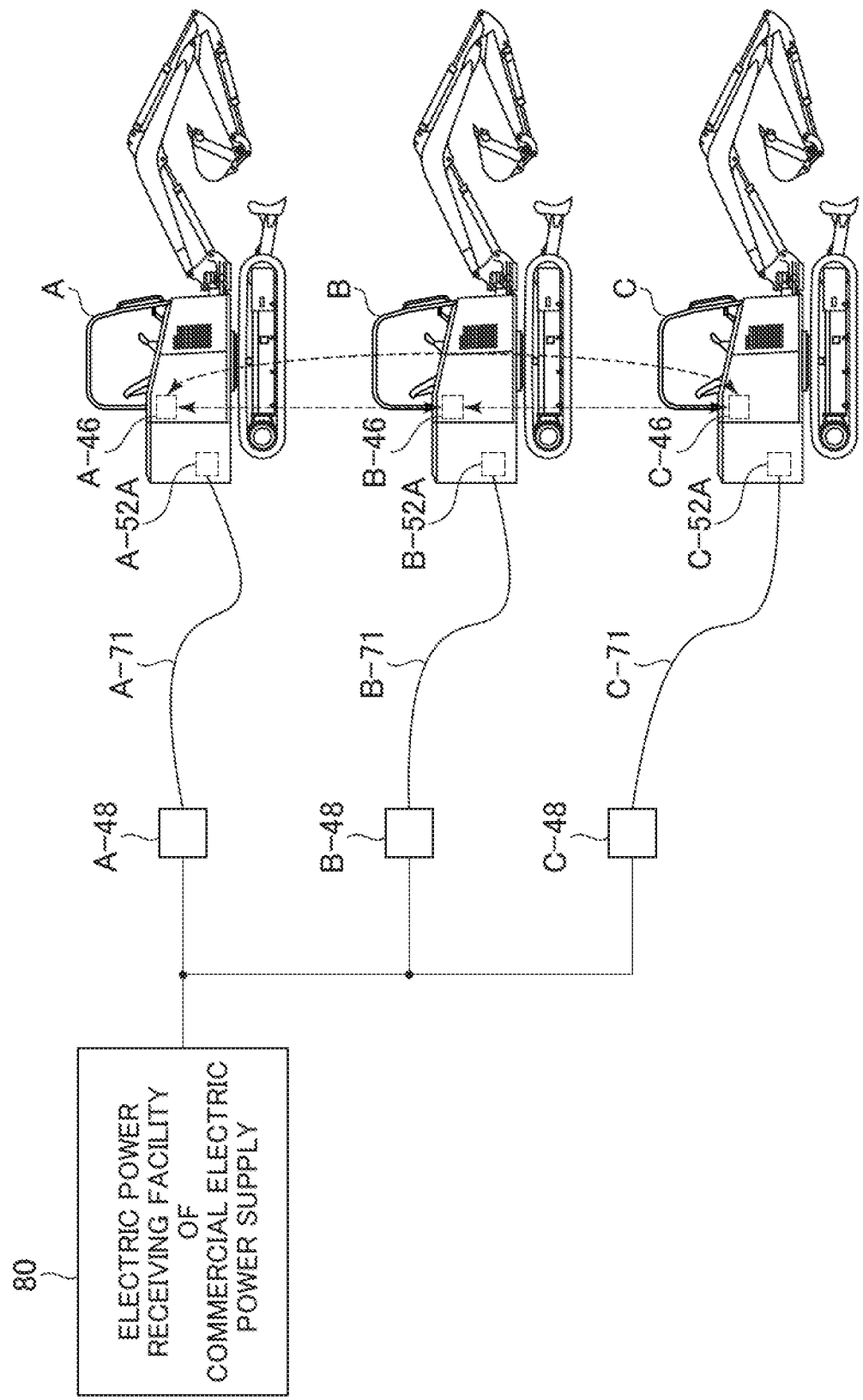
FIG. 10 is a general configuration diagram related to operation of a plurality of electrically driven hydraulic excavators that operate with an electric power supplied from the same electric power receiving facility of a commercial electric power supply.

FIG. 10 is a general configuration diagram related to operation of a plurality of electrically driven hydraulic excavators that operate with an electric power supplied from the same electric power receiving facility 80 of the commercial electric power supply.

A feed cable A-71 is connected to a power receiving connector A-52A provided to an electrically driven hydraulic excavator A, and is supplied with power of a commercial electric power supply from a distribution board A-48.

Similarly, a feed cable B-71 is connected to a power receiving connector B-52A provided to an electrically driven hydraulic excavator B, and is supplied with the power of the commercial electric power supply from a distribution board B-48. A feed cable C-71 is connected to a power receiving connector C-52A provided to an electrically driven hydraulic excavator C, and is supplied with the power of the commercial electric power supply from a distribution board C-48.

The distribution boards A-48, B-48 and C-48 are connected in parallel to the electric power receiving facility 80 of the commercial electric power supply, and is supplied with the power of the commercial electric power supply from the electric power receiving facility 80.

In addition, a communication device A-46 included in the electrically driven hydraulic excavator A, a communication device B-46 included in the electrically driven hydraulic excavator B, and a communication device C-46 included in the electrically driven hydraulic excavator C form a wireless network, and mutually transmit and receive data input from controllers (depicted in FIG. 4).

Incidentally, description will be made by taking the three electrically driven hydraulic excavators A, B and C for simplification.

Suppose that each machine body is operating in the commercial electric power operation mode, that is, operating with the electric power supplied from the same electric power receiving facility 80 of the commercial electric power supply.

In addition, suppose that the electric power supply allowable power PSlim determined in consideration of an amount of conversion from the supplied power to the power of the electrically driven hydraulic excavator so as not to exceed the allowable electric power of the electric power receiving facility 80 is set in the internal setting recording section 71 (depicted in FIG. 8) of each machine body.

The electric power supply allowable power PSlim is computed when the worker inputs the contracted electric power set in the electric power receiving facility 80 of the commercial electric power supply to the monitor 30 provided to each machine body as described above.

<Case where the Sum of the Demanded Powers of the Electrically Driven Construction Machines does not Exceed the Allowable Power>

Suppose that the demanded power of the electrically driven hydraulic excavator A is Pd1, the demanded power of the electrically driven hydraulic excavator B is Pd2, and the demanded power of the electrically driven hydraulic excavator C is Pd3.

The demanded power Pd1 is sent as data to the electrically driven hydraulic excavator B and the electrically driven hydraulic excavator C through the communication device A-46.

Similarly, the demanded power Pd2 is sent to the electrically driven hydraulic excavator A and the electrically driven hydraulic excavator C through the communication device B-46, and the demanded power Pd3 is sent to the electrically driven hydraulic excavator A and the electrically driven hydraulic excavator B through the communication device C-46.

The allowable power computing section 72 of the electrically driven hydraulic excavator A computes an allowable power Plim (A) by Equation (3) depicted below.

[Math 3]

$$Plim(A) = PSlim \times \frac{Pd1}{Pd1 + Pd2 + Pd3} \tag{3}$$

According to Equation (3), Plim (A)>Pd1 when Pd1+Pd2+Pd3 as a sum of the demanded power Pd1 of the electrically driven hydraulic excavator A, the demanded power Pd2 of the electrically driven hydraulic excavator B, and the demanded power Pd3 of the electrically driven hydraulic excavator C is less than the electric power supply allowable power PSlim. In this case, the target demanded power Pr as the output of the minimum value selecting section 73 is Pd1.

Similarly, the allowable power Plim (B) computed by the electrically driven hydraulic excavator B and the allowable power Plim (C) computed by the electrically driven hydraulic excavator C are computed by Equation (4) depicted below.

[Math 4]

$$Plim(B) = PSlim \times \frac{Pd2}{Pd1 + Pd2 + Pd3} \tag{4}$$

$$Plim(C) = PSlim \times \frac{Pd3}{Pd1 + Pd2 + Pd3}$$

As in the case of the electrically driven hydraulic excavator A, the target demanded powers Pr as outputs of the minimum value selecting sections 73 of the electrically driven hydraulic excavators B and C are Pd2 and Pd3, respectively. Thus, the motor demanded revolution speeds Ndr are determined by the demanded powers Pd1, Pd2, and Pd3, and are not limited by the allowable power Plim.

Hence, when a sum of the demanded powers of the electrically driven hydraulic excavators operating with the electric power supplied from the electric power receiving facility 80 of the same commercial electric power supply does not exceed the allowable power PSlim in which the allowable electric power is considered, operation is not limited by the allowable power Plim, but is performed at a demanded revolution speed corresponding to the demanded power.

<Case where the Sum of the Demanded Powers of the Electrically Driven Construction Machines Exceeds the Allowable Electric Power>

Plim<Pd1 when Pd1+Pd2+Pd3 as the sum of the demanded power Pd1 of the electrically driven hydraulic excavator A, the demanded power Pd2 of the electrically driven hydraulic excavator B, and the demanded power Pd3 of the electrically driven hydraulic excavator C exceeds the electric power supply allowable power PSlim in the allowable power computing section 72 within the electrically driven hydraulic excavator A. Hence, the target demanded power Pr as the output of the minimum value selecting section 73 is Plim (A).

Similarly, also in the electrically driven hydraulic excavator B and the electrically driven hydraulic excavator C, the target demanded powers Pr as the outputs of the minimum value selecting sections 73 are Plim (B) and Plim (C), respectively. Thus, the motor demanded revolution speeds Ndr are determined by the allowable powers Plim (A), Plim (B), and Plim (C), and are limited by the allowable power Plim.

At this time, a sum of the allowable powers of the electrically driven hydraulic excavators A, B, and C is a result of computation of Equation (5) depicted below.

[Math 5]

$$Plim(A)+Plim(B)+Plim(C)=PSlim \quad (5)$$

Hence, the sum of the allowable powers of the respective electrically driven hydraulic excavators is limited to the electric power supply allowable power PSlim. A situation is thus avoided in which a sum of the powers supplied to the respective machine bodies exceeds the allowable electric power of the electric power receiving facility 80 of the commercial electric power supply.

Effect

As described above, according to the present embodiment, in a case where a plurality of electrically driven construction machines operate simultaneously, it is possible to avoid exceeding the allowable electric power that can be output by the electric power receiving facility 80 of the commercial electric power supply as an external electric power supply while distributing supplied electric power without a work imbalance between different machine bodies according to the respective demanded powers Pd1, Pd2, Pd3, . . . , Pdn of the plurality of electrically driven construction machines thereby make it possible to perform work efficiently within the allowable electric power of the electric power receiving facility 80.

It is to be noted that while description has been made of a case where the electrically driven construction machine is a hydraulic excavator of a crawler type in the foregoing embodiment, the electrically driven construction machine may be a construction machine other than a hydraulic excavator, for example, another construction machine such as a hydraulic excavator of a wheel type, or a wheel loader.

DESCRIPTION OF REFERENCE CHARACTERS

1: Lower track structure
2: Upper swing structure
5: Work device
7: Battery device
13A, 13B: Travelling hydraulic motor
16: Boom
17: Arm
18: Bucket
19: Boom hydraulic cylinder
20: Arm hydraulic cylinder
21: Bucket hydraulic cylinder
23A: Travelling control lever
24B: Boom and bucket control lever
25: Pressure sensor
26A, 26B, 26C, 26D: Pressure sensor
27: Key switch
28: Dial
29: Charge switch
30: Monitor
31: Electric motor
32: Inverter
33: Hydraulic pump
34: Pilot pump
35: Left travelling operation device
37: Bucket and boom operation device
36: Left travelling directional control valve
38: Boom directional control valve
46: Communication device
47: Lock switch
48: Commercial electric power distribution board
49: Direct-current power rapid charger
50: Rectifier
51: Changer
52A, 52B: Power receiving connector
53: Controller
70: Demanded power computing section
71: Internal setting recording section
72: Allowable power computing section
73: Minimum value selecting section
74: Target revolution speed computation table
75: Motor revolution speed computing section
76: Minimum value selecting section
77A, 77B, 77C, 77D: Table
78: Maximum value selecting section
80: Electric power receiving facility
A, B, C: Electrically driven hydraulic excavator (electrically driven construction machine)
PSlim: Electric power supply allowable power
Plim: Allowable power
Pd1: (Own) demanded power
Pr: Target demanded power
Ndr: Motor demanded revolution speed
Nd: Revolution speed control command

The invention claimed is:

1. An electrically driven construction machine comprising:
an electric motor;
a hydraulic pump driven by the electric motor;
a plurality of hydraulic actuators driven by a pressurized fluid delivered from the hydraulic pump;
a plurality of directional control valves that control flows of the pressurized fluid supplied from the hydraulic pump to the plurality of hydraulic actuators; and a plurality of operation devices that generate operation signals for instructing operation of the plurality of hydraulic actuators and switching the plurality of directional control valves, the electric motor being driven by an electric power from an electric power receiving facility;

wherein the electrically driven construction machine further comprises:

a communication device that transmits and receives data to and from other electrically driven construction machines sharing the electric power receiving facility; and a controller configured to compute an own demanded power for driving the plurality of hydraulic actuators on a basis of the operation signals of the plurality of operation devices, transmit the own demanded power to the other electrically driven construction machines through the communication device, and receive demanded powers computed in the other electrically driven construction machines through the communication device, and wherein the controller is further configured to compute an allowable power usable by the electric motor on a basis of the own demanded power, demanded powers of the other electrically driven construction machines received through the communication device, and a predetermined allowable electric power of the electric power receiving facility, and control the electric motor such that a power consumption of the electric motor does not exceed the allowable power usable by the electric motor.

2. The electrically driven construction machine according to claim 1, wherein the controller is configured to compute a ratio of the own demanded power to a total demanded power of the own demanded power and the demanded powers of the other electrically driven construction machine received through the communication device, and compute the allowable power usable by the electric motor on a basis of the allowable electric power of the electric power receiving facility and the ratio.

3. The electrically driven construction machine according to claim 2, wherein the controller is configured to set beforehand an electric power supply allowable power computed on a basis of the allowable electric power of the electric power receiving facility, and compute the allowable power usable by the electric motor by multiplying the electric power supply allowable power by the ratio of the own demanded power.

4. The electrically driven construction machine according to claim 1, wherein the controller is configured to select a smaller value of the own demanded power and the allowable power usable by the electric motor as a target demanded power, compute a demanded revolution speed of the electric motor on a basis of the target demanded power, and control a revolution speed of the electric motor on a basis of the demanded revolution speed.

5. The electrically driven construction machine according to claim 1, wherein the plurality of operation devices are of a hydraulic pilot type that generates a pilot pressure as the operation signal, the electrically driven construction machine further comprises a plurality of pressure sensors that detect a plurality of pilot pressures generated by the plurality of operation devices, and the controller is configured to compute the own demanded power on a basis of the plurality of pilot pressures detected by the plurality of pressure sensors.

* * * * *